RECTIFIER NETWORK ASSEMBLY

Original Filed July 30, 1971 3 Sheets-Sheet 1

RECTIFIER NETWORK ASSEMBLY

Original Filed July 30, 1971 3 Sheets-Sheet 2

RECTIFIER NETWORK ASSEMBLY

Original Filed July 30, 1971 3 Sheets-Sheet 3

United States Patent Office

Re. 28,145
Reissued Sept. 3, 1974

28,145
RECTIFIER NETWORK ASSEMBLY

Paul A. Tharman, Milwaukee, Wis., assignor to Briggs & Stratton Corporation, Wauwatosa, Wis.

Original No. 3,678,366, dated July 18, 1972, Ser. No. 167,691, July 30, 1971. Application for reissue Oct. 25, 1972, Ser. No. 300,527
Int. Cl. H02m *7/00*
U.S. Cl. 321—8 R 6 Claims

Matter enclosed in heavy brackets [ ] appears in the original patent but forms no part of this reissue specification; matter printed in italics indicates the additions made by reissue.

ABSTRACT OF THE DISCLOSURE

In a rectifier assembly comprising diodes that have wire terminals projecting axially in opposite directions from a cylindrical body, permanent connections between diode terminals comprise crimp connectors integral with terminal members such as plug jacks. The terminal members are seated in bores in a plug body which is partway received in an open topped metal casing. The casing is filled with epoxy that embeds the diodes, their connections with the terminal members and part of the plug body.

This invention relates to means for connecting and mounting small diodes comprising a full-wave rectifier network and for making detachable electrical connections to that network; and the invention has more particular reference to a very simple, compact and inexpensive assembly comprising diodes, means connecting the diodes in a full-wave rectifier network, and means for making plug-in connections between the rectifier network, a source of alternating current and a d.c. load circuit.

Full-wave rectifier networks are finding increasing application in accessories for small single-cylinder gasoline engines of the type used for powering lawn mowers, garden tractors, snow blowers and similar machines. In many cases such engines are manufactured with a more or less integral alternator that comprises permanent magnets carried by the engine flywheel and a stator mounted on the engine body adjacent to the flywheel. The alternator serves as a source of current for battery charging or for other purposes that require its a.c. output to be converted to d.c. The rectifier for effecting such conversion comprises small solid state diodes which are connected with one another in a bridge arrangement, and which must also be connectable with the a.c. input source and the d.c. load circuit.

In general, structure comprising the rectifier network and its connections must provide a protecting enclosure for the diodes and connections between them and a heat sink for the diodes, must provide for readily detachably connecting the rectifier network with its associated input and output circuits to facilitate assembly and servicing of the engine, and should so support all of its components that the connections between them are immune to the effects of vibration. These are basic mechanical requirements for the structure, but competitive conditions in the small engine and electrical equipment industries have added another requirement which is at least as demanding as those dictated by function, namely the requirements for utmost minimization of cost without the slightest compromise with quality.

A prior structure that served the same purpose as the one of this invention comprised a small block-like capsule in which the diodes of the rectifier network were embedded and from one side of which three wires led to a plug connector. A metal bushing through the center of the capsule provided for mounting it by means of a single screw or rivet and also served as a ground connection and as a heat sink for the diodes. The plug connector was provided with integral clips by which it was secured to a bracket that was supported by two screws or rivets. That prior structure embodied a high degree of engineering skill, was functionally satisfactory in all respects, and was not unduly expensive considering its nature and purpose.

Nevertheless, it is the general object of this invention to provide an assembly which performs all of the functions and possesses all of the advantages of that prior structure but which can be manufactured at roughly half its cost, can be assembled to an engine with a lesser number of operations to afford a further cost saving, and is also superior to prior structure in sturdiness and dependability so that the consumer derives a material benefit from the present invention even when the cost savings that it achieves cannot be passed on to him because of economic conditions.

It is also an object of this invention to provide an assembly comprising diodes permanently connected in a rectifier network and means for making readily disconnectable connections to them, which structure is extremely compact and inexpensive, nicely fulfills all of the mechanical requirements set forth above, and has the further important advantage of having no unsupported conductors leading from one component of the assembly to another, thus eliminating both the cost of such conductors and the potential troubles it can be caused by their breaking.

Another and more specific object of the invention is to provide mechanical structure comprising small diodes connected in a rectifier network, wherein the terminals of the diodes have secure solderless connections with one another that also comprise quick disconnect terminals for connecting the rectifier network with input and output circuits.

It is also a specific object of this invention to provide a mounting and enclosure for small diodes comprising a rectifier network, whereby the diodes and the connections between them, as well as their connections to plug-in terminals, are all encapsulated, to render the assembly substantially immune to moisture and vibration, and wherein the diodes are provided with an effective heat sink.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
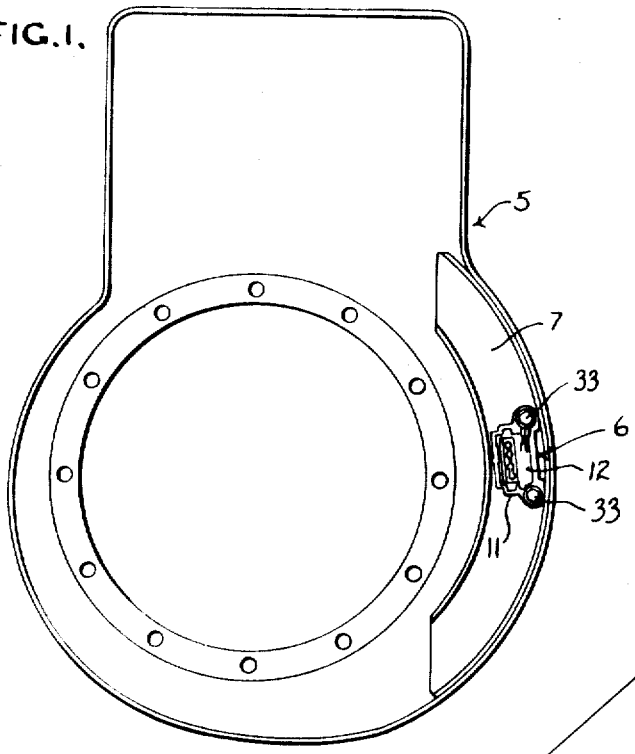
FIG. 1 is a view in elevation of a blower housing for a single cylinder gasoline engine, upon which there is mounted a rectifier network assembly embodying the principles of this invention.
Figure 1:
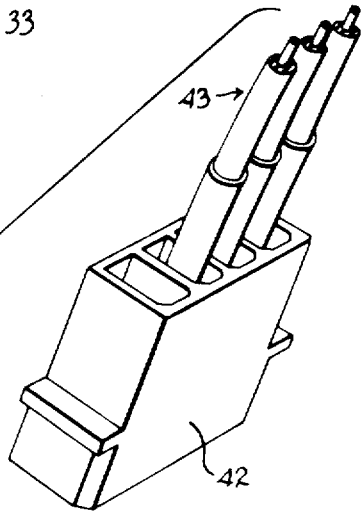
Figure 2:
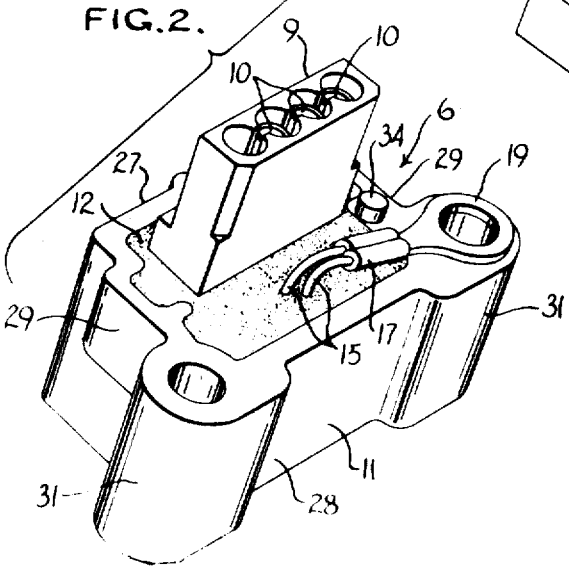
FIG. 2 is a perspective view of the rectifier network assembly of this invention, shown in disassembled relationship to a plug which cooperates with it to provide for connecting the rectifier network with input and output circuits.

Referring now more particularly to the accompanying drawings, the numeral 5 designates generally a blower housing or shroud for a single cylinder gasoline engine of the type used for powering lawn mowers, small tractors and the like. The shroud 5 embraces the engine body to guide cooling air across the cylinder and crankcase portions of the engine from a flywheel blower (not shown). The rectifier network assembly 6 of this invention is mounted on a bracket 7 on the shroud, at one side of a portion of the shroud that is adjacent to the flywheel, and it can in fact utilize the same mounting holes that served for securement of the plug connector alone of the above described prior assembly.

In general, the rectifier network assembly 6 comprises four diodes 8, a plug body 9 of insulating material which houses three plug-in terminal elements 10 that are connected with certain of the diodes, a metal casing 11, and a body 12 of hardened potting or encapsulating material such as epoxy that secures the plug body 9 in the casing and embeds the diodes.

Figure 6:
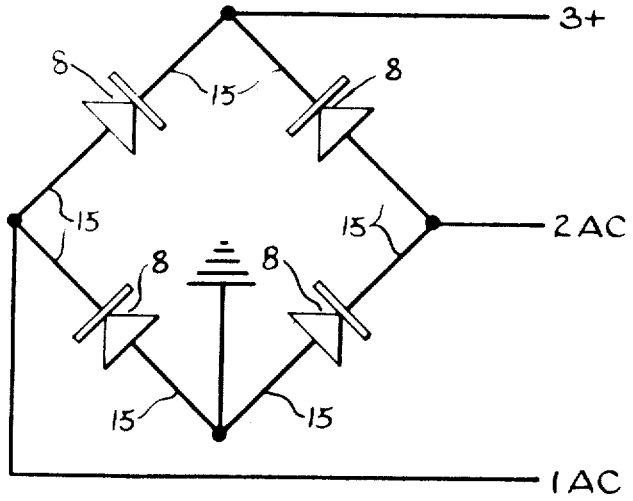
FIG. 6 is a schematic diagram of the circuit provided by the assembly of this invention.

Each of the diodes 8 is of the solid state type and comprises, as is conventional in low power applications, a small cylindrical body 14 and a pair of wires 15 that extend substantially axially from opposite ends of the body and comprise the terminals of the diode. For the diodes to coperate in a full-wave rectifier network, each must have its terminals connected with a terminal of each of two other diodes, in the arrangement illustrated in FIG. 6; and each connected pair of terminals must also be connectable with a terminal of a circuit associated with the rectifier network.

The means connecting each pair of diode terminals comprises a solderless crimp connector 17 that is integral with an element that serves for connection of the rectifier network with its associated circuits. In this case, three of the crimp connectors are on the plug-in terminal elements 10, and the fourth is on a terminal lug 19 that provides for grounding one of the d.c. output terminals of the rectifier network (preferably the negative one) to the blower shroud and, through it, to the engine body. If the rectifier network is not to be grounded, all four of the crimp connectors would obviously be on plug-in terminal elements 10.

As shown, the terminal elements are female ones, in the nature of small tubular plug jacks of a commercially available type, adapted to cooperate with snugly fitting pin-like male plug members. The terminal elements are seated in the plug body 9, which can be molded of a plastic insulating material such as nylon. The plug body is relatively long and narrow and has four parallel bores 20 extending heightwise through it from one of its narrow faces to the other, arranged in a row along its length. Each of the bores accommodates one of the plug-in terminal elements 10. In the illustrated embodiment, one of the bores is not occupied by a terminal element in view of the provision for grounding the d.c. side of the rectifier network, but that bore is available for another terminal element if ungrounded circuits are desired.

Each of the plug-in terminal elements 10 has radially projecting integral tangs 22 and 23 that are spaced from both ends of its tubular body portion. They permit element to be inerted axially into the plug body 9 from the bottom thereof, but once the element has been pushed all the way into the plug body, the tangs engage circumferential shoulders in the plug body, defined by different diameter portions of the bore, to confine the terminal element against axial displacement. Each of the bores 20 has a substantially enlarged diameter lower end portion to accommodate the crimp connector 17 at the rear of the terminal element.

Figure 3:
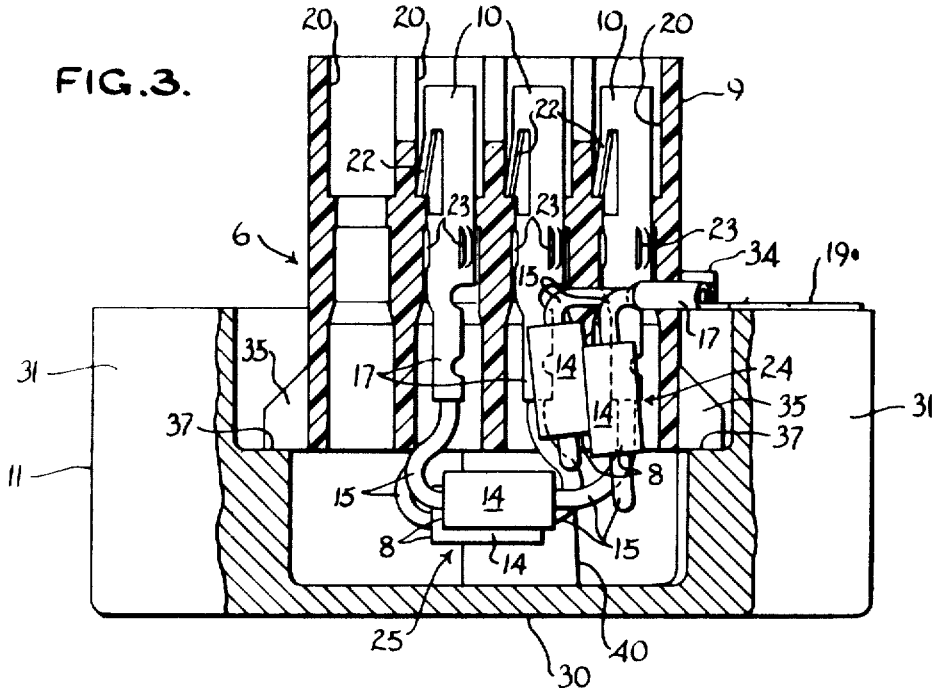
FIG. 3 is a view in vertical section of the rectifier network assembly, but without potting material.
Figure 4:
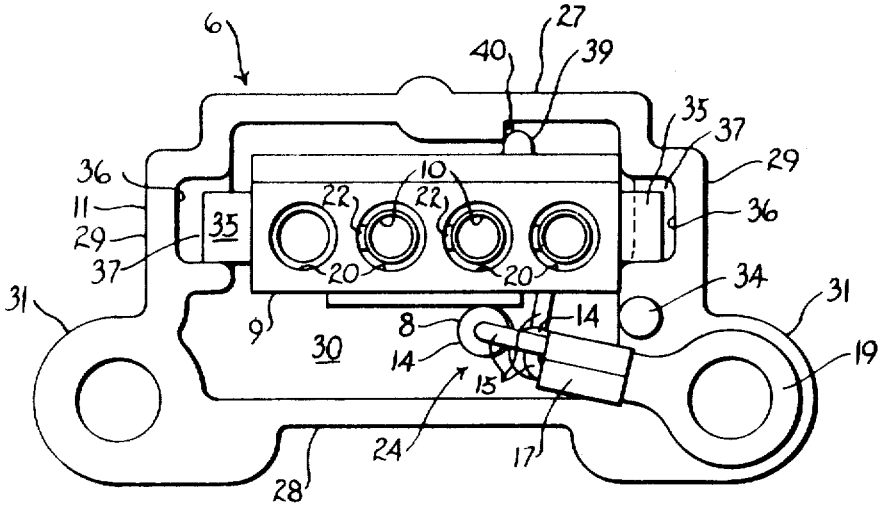
FIG. 4 is a top plan view of the assembly shown in FIG. 3.
Figure 5:
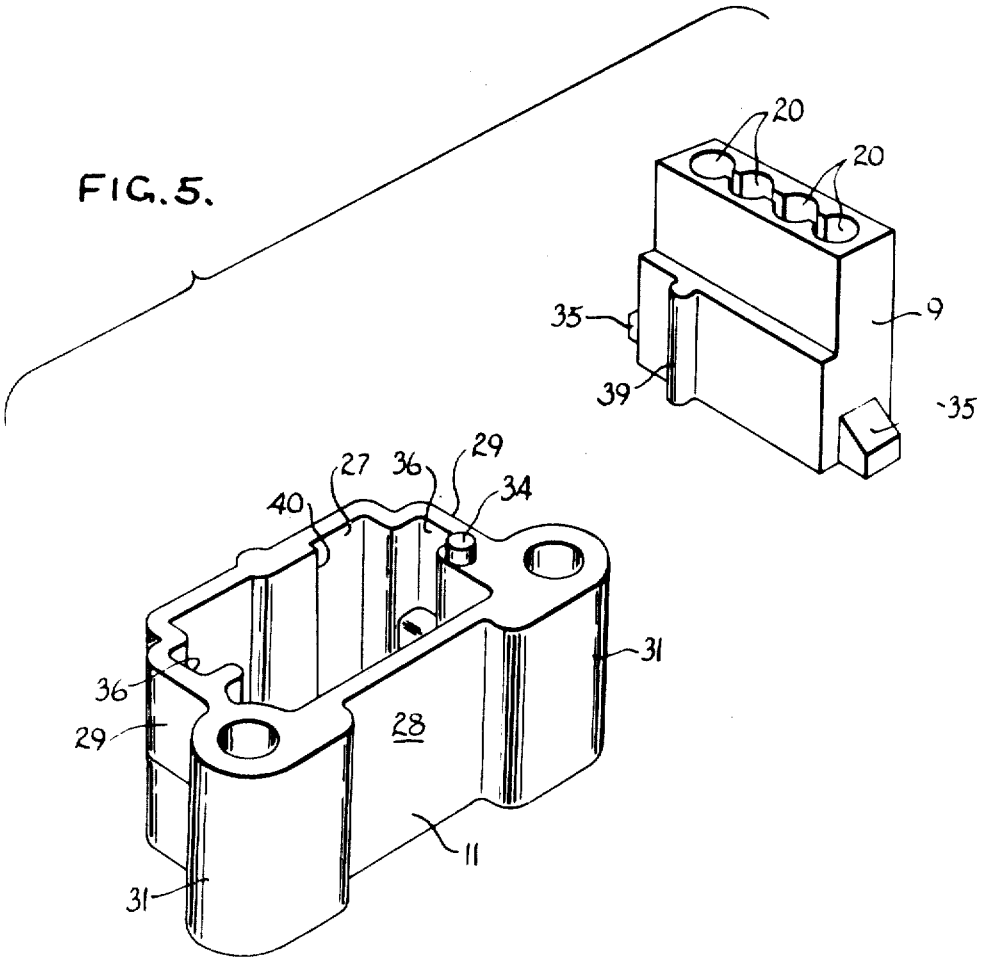
FIG. 5 is a group perspective view of the plug body and casing of the assembly of this invention.

Before they are secured to the crimp connectors, all of the terminal wires 15 of the diodes are cut to the same length, and with the wires trimmed and connected and the terminal elements installed in the plug body, the diodes can be readily arranged as shown in FIGS. 3 and 4, with the two diodes that are connected to the terminal lug 19 disposed alongside one wide face of the plug body, as at 24, and the other two directly beneath its narrow bottom face, as at 25. The terminal lug 19 projects toward one narrow side of the plug body, and the two diodes that have terminals connected to it have their other terminals connected with terminal elements 10 in the two bores 20 that are nearest said side of the plug body. With the diodes and terminal elements arranged as just described, the unconnected terminals of the several diodes are well separated from one another.

The metal casing 11 in which the plug body and diodes are received is preferably made as a generally cup-shaped die casting, of zinc or the like. It has relatively wide front and rear end walls 27 and 28, relatively narrow side walls 29, and a bottom wall 30, but it is open at its top. Along the junction of each of its side walls with its rear wall it has a heightwise extending boss or ear 31 that is bored to receive a mounting fastener such as a screw 33 or a rivet. Each of these mounting bosses has a relatively wide, flat top surface, so that the terminal lug 19 can be clamped flatwise against it by the fastener that extends therethrough to make a good grounding connection. A small tit 34 projects up from the top of the casing in a position to be engaged by the shank of the terminal lug and hold the same against rotation with the screw 33 as the screw is tightened.

Projecting laterally outwardly from each narrow side surface of the plug body 9, near the bottom thereof, is a lug 35 that is received in an inwardly opening groove 36 in the casing to properly locate the plug body relative to the casing during its assembly thereinto. The grooves 36, which extend heightwise along the side walls 29 of the casing, at the inner surfaces thereof, are closer to the front wall 27 of the casing than to its rear wall. They of course open to the top of the casing, but they terminate a distance from its bottom to define shoulders 37 that cooperate with the lugs 35 on the plug body to hold the latter spaced a distance above the bottom wall 30 of the casing. The space between the bottom of the plug body and the bottom wall of the casing accommodates the two diodes that underlie the plug body at 25. The space between the plug body and the rear wall 28 of the casing accommodates the other two diodes, at 24, that are disposed alongside the plug body.

The plug body can be provided with a rib 39 that engages a corner of a small pad 40 on the inner surface of the front wall 27 of the casing, to cause the plug body to engage one side wall 29 of the casing with an easy press fit by which the plug body is retained against accidental displacement until the potting material 12 has cured.

The two diodes that are alongside the plug body at 25 are disposed below the top of the casing, hence when the casing is filled to its top with hardenable liquid potting or encapsulating material, such as epoxy, all of the diodes are embedded in such material and are thus protected by it. The epoxy also serves to transmit heat from the diodes to the metal casing so that the later can serve as a heat sink.

The potting material, which ordinarily does not bond well to nylon and similar plastics, covers the outer faces of the lugs 35 on the plug body and thus anchors the plug body into the casing. Note that the potting material also fills those portions of the bores 20 in the plug body that contain the crimp connectors on the terminal elements 17, so that all permanent connections in the assembly are embedded and thus rigidly supported, and all unconnected diode terminals are insulated from one another by the potting material.

The plug body 9 projects a distance above the top of the casing for cooperation with a plug member 42 that fits over the plug body and has conventional pin-like male terminal members therein, connected with conductors 43 that lead to and from the input and output circuits.

From the foregoing description taken with the accompanying drawings it will be apparent that this invention provides a very compact, inexpensive and rugged assembly comprising diodes permanently connected in a rectifier network and means for readily detachably connecting the rectifier network with its associated input and output circuits, which assembly affords protection to the diodes against moisture and mechanical impacts and vibration, provides a heat sink for them, and maintains good, rigid connections between their terminals and terminal elements that provide for connections to the rectifier network.

Those skilled in the art will appreciate that the invention can be embodied in forms other than as herein disclosed for purposes of illustration.

The invention is defined by the following claims.

I claim:

1. Means permanently connecting four diodes with one another in a full wave rectifier network and providing for readily disconnectable connection of the rectifier network with a source of alternating current and with a direct current load circuit, each of the diodes being of the type comprising a body from which wires that comprise terminals extend in opposite directions, said means comprising:

A. crimped connector means, each comprising a part of a plug-in terminal element, connecting terminals of the diodes;

B. a connector plug body of insulating material having bores therethrough which open to opposite faces thereof and in which said plug-in terminal elements are seated with all of said plug-in terminal elements accessible at one of said faces, the diodes being outwardly adjacent to the other of said faces;

C. a metal casing in which the plug body and the diodes are received, the plug body having at least its said one face exposed at the exterior of said casing; and D. a mass of hardened plastic insulating material in the casing securing the plug body therein and insulating embedding the diodes and the connector means.

2. The structure of claim 1 wherein said casing has a pair of holes therethrough in which securement means are receivable for fastening the casing in electrically grounded relationship to structure that carries the casing, further characterized by:

one of said crimped connector means comprising a terminal lug which overlies a face of the casing to which one of said holes opens, to be secured to the casing by one of said securement means and to thus ground the rectifier network.

3. In combination with four diodes, each of the type comprising a body and a pair of wires that extend in opposite directions from the body and serve as terminals for the diode, means permanently connecting the diodes in a full-wave rectifier network and providing for its connection with a source of alternating current and with a direct current load circuit:

A. a plurality of plug-in terminal elements each of the type having an integral crimp connector, the crimp connector of each terminal element being connected to one of the wires of each of a pair of diodes to connect them;

B. a connector plug body of insulating material having a plurality of bores therethrough that open to top and bottom faces of said body, said terminal elements being seated in said bores and being accessible to mating terminal members at the top face of the body, the diodes being outwardly adjacent to the lower portion of said body;

C. a generally cup-like metal casing, the bodies of the diodes being wholly received within said casing and at least the bottom portion of the plug body being received therein; and D. a mass of hardened plastic insulating material in the casing bonding the plug body thereto and embedding the diodes and their connections with the terminal elements.

4. The combination of claim 3, in which said metal casing has opposite side walls and opposite end walls, further characterized by:

E. the casing having opposite inwardly opening grooves in its side walls that open to its top;

F. the plug body having lugs which are received in said grooves and which are overlain by portions of said mass to hold the plug body against displacement out of the casing, said lugs cooperating with the grooves in the casing and with said mass to hold the plug body spaced from one of the end walls of the casing and thus define a compartment in the casing in which diodes bodies are received.

5. The combination of claim 4, in which the metal casing has a bottom wall, further characterized by:

G. said grooves terminating a distance above said bottom wall to define upwardly facing shoulders upon which said lugs rest and which cooperate with the lugs to maintain the plug body spaced above the bottom wall, diodes being disposed in the space between the plug body and the bottom wall.

*6. A device for permanently electrically connecting the components of a rectifier network, which components have lead wires projecting therefrom, and providing for readily disconnectible connection of said network with a source of alternating current and with a direct current load circuit, said device comprising:*

*A. a plurality of crimped connector means, each comprising a part of a plug-in terminal element, and each connected to one of said lead wires;*

*B. a connector plug body of insulating material having bores therethrough which open to opposite faces thereof and in which said plug-in terminal elements are seated with all of said plug-in terminal elements accessible at one of said faces;*

*C. a metal casing in which the plug body and said network are received, the plug body having at least its said one face exposed at the exterior of said casing; and*

*D. a mass of hardened plastic insulating material in the casing securing the plug body therein and insulating embedding said network.*

References Cited

The following references, cited by the Examiner, are of record in the patented file of this patent or the original patent.

UNITED STATES PATENTS

| | | | |
|---|---|---|---|
| 3,131,331 | 4/1964 | Ray | 317—123 |
| 3,184,648 | 5/1965 | Brown et al. | 174—52 PE |
| 3,249,827 | 5/1966 | Benda et al. | 174—52 PE |
| 3,500,085 | 3/1970 | Smith | 310—68 R |

WILLIAM M. SHOOP, Jr., Primary Examiner

U.S. Cl. X.R.

174—52 PE; 307—150, 151